J. B. HERMAN.
Wheel-Plows.
No. 156,924. Patented Nov. 17, 1874.
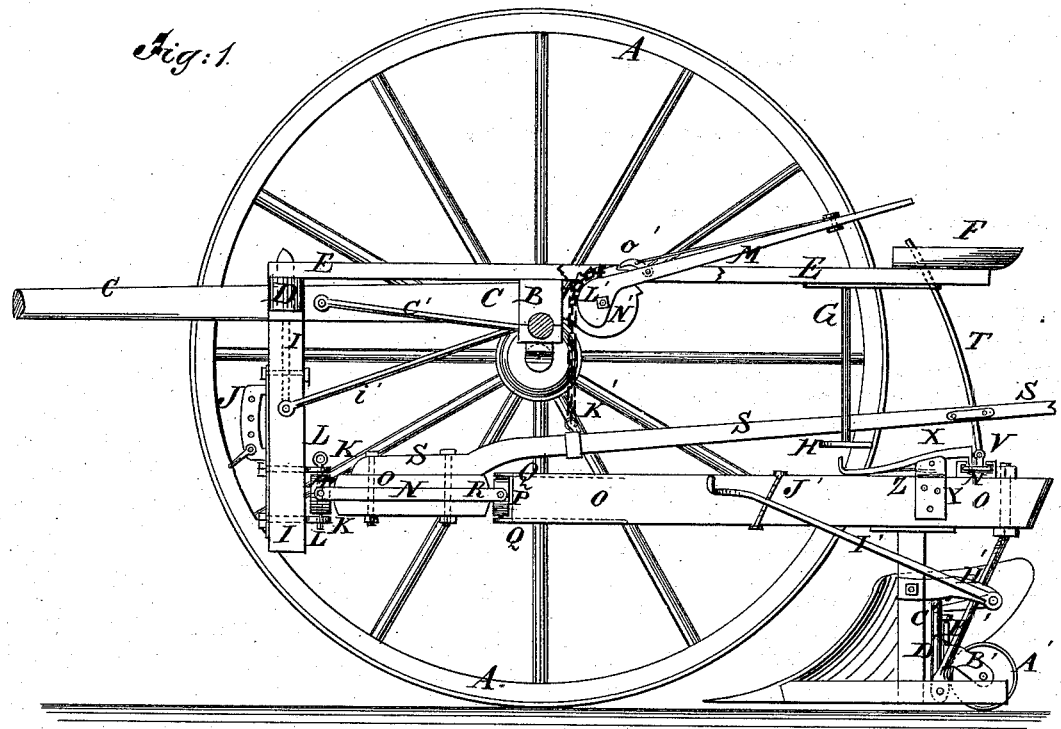
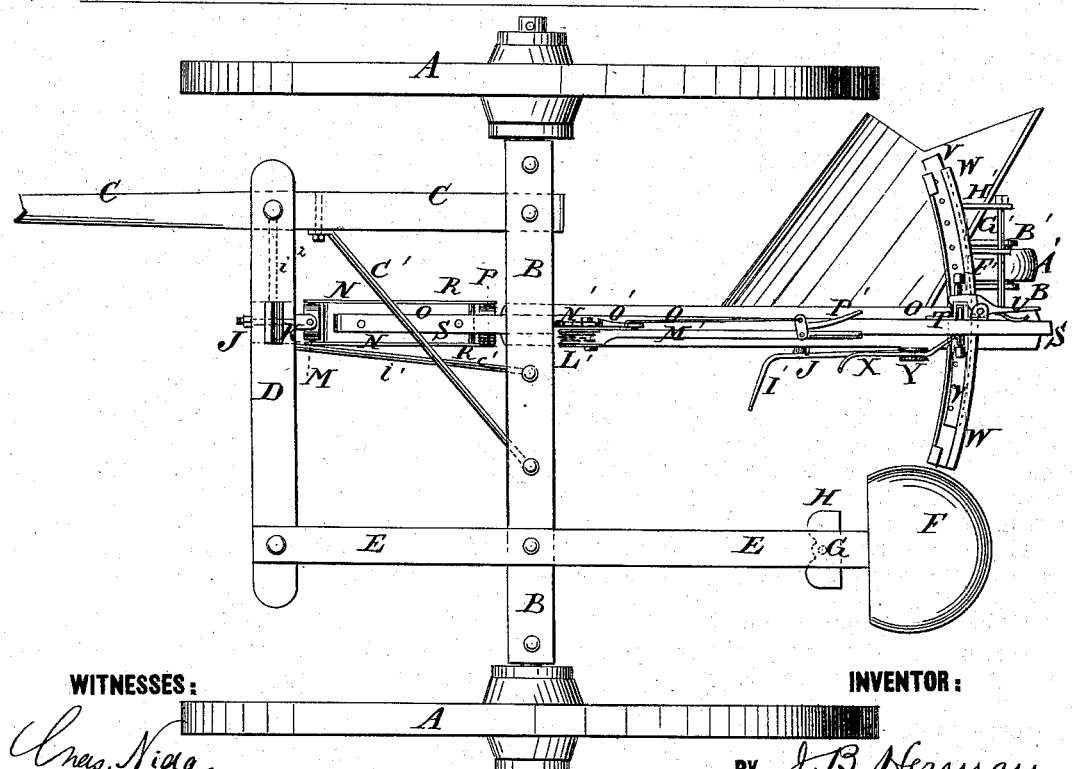

UNITED STATES PATENT OFFICE.

JOHN B. HERMAN, OF BLAIR, NEBRASKA.

IMPROVEMENT IN WHEEL-PLOWS.

Specification forming part of Letters Patent No. 156,924, dated November 17, 1874; application filed August 10, 1874.

*To all whom it may concern:*

Be it known that I, JOHN B. HERMAN, of Blair, in the county of Washington and State of Nebraska, have invented a new and useful Improvement in Riding-Plow, of which the following is a specification:

Figure 1 is a side view of my improved machine, the near wheel being removed. Fig. 2 is a top view of the same.

Similar letters of reference indicate corresponding parts.

The invention will first be fully described, and then pointed out in the claims.

A are the wheels, which revolve upon the journals of the axle B, one of said journals being placed lower than the other, so that the machine may run level when one of its wheels runs in the furrow and the other upon the unplowed land. C is the tongue, the rear end of which is rigidly attached to the axle B near one end, and which is strengthened by an inclined brace, $c'$, the forward end of which is secured to the said tongue C, and its rear end is secured to the axle B. To the tongue C, at a little distance in front of the axle B, is secured a cross-bar, D, which projects parallel with the axle B; and its other end is secured to the forward end of the bar E. The bar E projects in the rear of the axle B, and to its rear end is attached the driver's seat F. To the bar E, a little in front of the seat F, is attached the upper end of a rod, G, to the lower end of which is attached a cross-bar, H, to serve as a rest or support for the driver's feet. To the cross-bar D, near the side of the tongue C, is attached the upper end of a downwardly-projecting bar, I, which is strengthened by the inclined braces $i^1$ $i^2$, the lower ends of which are attached to the said bar I. The upper end of the brace $i^1$ is attached to the axle B, and the upper end of the brace $i^2$ is attached to the tongue C. To the forward side of the bar I is attached a draw-bar, J, having a number of holes formed in it at different elevations to receive the draft-clevis, so that the point of draft attachment may be adjusted higher or lower, as may be required. To the rear side of the bar I are attached two eye-bolts, K, placed the one directly above the other, and through which passes a pin, L, which also passes through a ring, M, placed vertically between the said eye-bolts K. To the opposite sides of the ring M are pivoted, by short bolts or rivets, the forward ends of two bars, N, which are secured to the opposite sides of the forward end of the plow-beam. By this construction, the plow-beam is connected to the bar I by a universal joint, which gives it a free vertical and lateral movement. The plow-beam O is made in two parts, which are connected to each other by a universal joint, which, in the drawings, is shown as being formed of a vertical ring, P, pivoted to and between the ends of two bars, Q, attached to the upper and lower sides of the forward end of the rear part of the plow-beam O, and to and between the ends of the two bars N, attached to the sides of the rear end of the forward part of the beam O, thus giving the rear end of the plow-beam a free vertical and lateral movement to enable the plow to be readily adjusted to cut a deeper or a shallower furrow, or a wider or narrower furrow, as may be desired. To the upper side of the forward part of the plow-beam O is rigidly attached the forward end of a lever, S, which projects back a little above and nearly parallel with the rear part of said beam O. T is a catch-bar, which passes through a keeper attached to the side of the rear part of the lever S, and has notches formed in it to receive a lever-catch, U, also attached to the side of the lever S. This construction enables the plow to be readily adjusted to run deeper or shallower in the ground, as may be desired. The catch-bar T may be curved, or its lower end may be hinged, to prevent it from binding while being adjusted. The lower end of the catch-bar T is attached or hinged to a cross-bar, V, which is curved in the arc of a circle, having its center in the universal joint connecting the ends of the parts of the plow-beams O. The cross-bar V slides longitudinally in a groove in a similarly-curved bar, W, attached to the rear part of the plow-beam O. In the sliding cross-bar V are formed a series of holes to receive the hooked end of the catch-lever X, which is pivoted to a support, Y, attached to the plow-beam O. The catch-lever X is held in gear with the cross-bar V by a small spring, Z, also attached to the said support Y. A' is a caster-wheel, the standard B' of which is pivoted to a bar, C', that slides vertically in a vertical grooved bar, D', placed between the mold-board and land-side of the plow E', and secured to the braces of said plow. To the sliding bar C' is attached the end of an arm, F', the other end of which is rigidly attached to a short shaft, G', which works in bearings in arms H', attached to the plow E'. To the shaft G' is rigidly attached a lever, I', which passes across a notched bar, J', attached to the side of the plow-beam O to hold the lever I' securely in position when adjusted. By this construction, the caster-wheel may be readily adjusted to take the downward pressure of the plow, and thus decrease the friction and enable it to be drawn by less power. To the lever S is attached the end of a chain, K', which passes around, and its other end is attached to, a segmental pulley, L', to which is attached, or upon which is formed, a lever, M'. The segmental pulley L' is pivoted to a notched or ratchet plate, N', attached to the axle B, and upon the teeth of which takes hold the pawl O', pivoted to the lever M', and operated by a hand-lever, P', also pivoted to said lever M'. This device enables the plow to be readily lowered to and raised from the ground when desired, and holds it securely in place when suspended.

Having thus described my invention, I claim as new and desire to secure by Letters Patent—

1. The combination of the lever S and catch-bar T with the two parts of the plow-beam O, substantially as herein shown and described.

2. The combination of the slide W, sliding bar V, and lock-lever X, with the catch-arm T, lever S, and plow-beam O, substantially as herein shown and described.

JOHN B. HERMAN.

Witnesses:
W. C. WALTON,
REUBEN F. ELDRIDGE.